United States Patent [19]

Gavagan et al.

[11] 4,359,237
[45] Nov. 16, 1982

[54] STATIC BELT LOOP SNUBBER SYSTEM

[75] Inventors: James A. Gavagan, Centerline; Ronald S. Gulette, Farmington Hills; Carl M. Petersen, III, Drayton Plains; Frank West, St. Clair Shores; William E. Brennan, Troy, all of Mich.

[73] Assignee: Irvin Industries Inc., Madison Heights, Mich.

[21] Appl. No.: 137,838

[22] Filed: Apr. 7, 1980

[51] Int. Cl.³ .............................................. B60R 21/10
[52] U.S. Cl. .................................. 280/806; 280/803; 280/808; 24/196
[58] Field of Search ............... 280/804, 802, 803, 808, 280/806; 242/107.2; 297/478; 24/136 K, 196; 116/200, 32, 203, 491

[56] References Cited

U.S. PATENT DOCUMENTS

| | | | |
|---|---|---|---|
| 3,551,961 | 1/1971 | Nygren | 24/196 |
| 3,847,434 | 11/1974 | Weman | 242/107.2 |
| 3,865,397 | 12/1974 | Pilhall | 280/803 |
| 3,913,977 | 10/1975 | Takada | 24/196 |
| 4,009,510 | 3/1977 | Lindblad | 280/808 |
| 4,129,321 | 12/1978 | Garvey | 280/801 |
| 4,138,142 | 2/1979 | Wize | 280/803 |
| 4,181,326 | 1/1980 | Hollowell | 280/803 |

Primary Examiner—Robert R. Song

[57] ABSTRACT

A vehicle safety belt system including a retractor with a static loop snubber operative to normally freely pass webbing and to lock under predetermined belt load thereby eliminating occupant excursion incident to belt tension on the retractor side of the static loop snubber.

1 Claim, 19 Drawing Figures

STATIC BELT LOOP SNUBBER SYSTEM

BACKGROUND OF THE INVENTION

Numerous safety belt systems have been employed and proposed which include a spool retractor or other webbing storing device, commonly for lap or shoulder belt or both. Examples are two retractors or single dual spool retractor in a three point system; a two point system employing single retractor for lap or shoulder belt; and a single loop system for belt and shoulder employing a single retractor. In such systems a number of locations for the retractors have been used, such as door, floor, pillar, roof, seat, console and in some cases, as an alternative for a spool retractor, other webbing storing devices may be employed such as linear storage units. The systems may be "passive" to assure occupant use or "active" providing occupants with a use option. In some systems inertia devices are employed to lock the retractor spools in response to vehicle deceleration requiring belt restraint.

Common to all such systems known to applicants before the present invention, whether involving inertia actuated or other lock up of the retractor, no provision has been made to prevent occupant excursion under belt load arising from belt extension in the entire system. Such yield, partially due to stretch in the webbing per se between the locked retractor and opposite belt end and partially to the multiple wraps of webbing on the spool tightening under belt load, is particularly detrimental in the case of shoulder belts found to yield in some cases sufficiently for the driver's body or head to impact the steering wheel and even for front seat occupants heads to hit the windshield.

The problem is further aggravated in the case of door mounted retractors particularly of the passive type, where sufficient webbing must be employed to accommodate full door opening during occupant entry and exit while the inside end remains anchored, which in a typical case may involve a cut length of webbing in the order of 96" for a shoulder belt and 78" for a complementary lap belt. This "excursion" problem has been known since the inception of belt retractors and some attempt has been made to mitigate it, e.g. by load responsive junction rings which proportion tension between belt and shoulder segments of a single loop system to thereby prevent "submarining" under the lap belt; also by a static loop for a shoulder belt which applies frictional resistance to passage of webbing under load. However, no prior solution is known which completely locks the webbing with zero slip from a static loop in close proximity to the occupant thereby limiting excursion due to belt stretch which is substantially confined to the relatively short length of webbing immediately employed in restraining the occupant.

The closest known prior art relevant to the present invention, as disclosed herein in a door mounted dual reel inertia retractor for lap belt and shoulder belts with comfort feature, include the following references:

Comfort feature mechanisms are disclosed in U.S. Pat. Nos. 4,149,683 and 4,165,054 which relieve belt retraction tension on the occupant upon slight protraction.

A single passive lap belt is disclosed in U.S. Pat. No. 3,771,814 employing a door mounted retractor.

A single passive shoulder belt installation is disclosed in U.S. Pat. No. 4,181,326 employing a door mounted retractor having a static loop guide on the door frame above the occupant's shoulder height. The webbing of the shoulder harness again involves a length sufficient to result in the problem of excessive belt extension.

A floor mounted dual reel retractor is disclosed in prior U.S. Pat. No. 4,135,683 which requires manual buckle release not suitable for a passive system.

Static loop webbing guides are known which normally permit free passage and frictionally impede web passage in response to predetermined back tension. However, a minimum back tension ratio in the order of 1:2 rather than 100% snubbing limits the effectiveness for reducing belt extension under load.

Snubbers employed in adjusting belt length in linear belt systems are known such as commonly used in adjusting length in aircraft and passenger car seat belts wherein the adjustment device is manually moved to an unlocking angle to permit lengthening and the surplus belt end is pulled freely through the device after buckling to take up the slack.

SUMMARY OF THE INVENTION

The static loop snubber of the present invention is located at a fixed point in the system; for example, on a door pillar or body pillar above the occupant's shoulder where a change in the direction of the belt webbing is involved. Free passage as required for normal retraction and belt extension is provided for all conditions of belt tension involved in the wind-up bias of the retractor. Initial belt tension exceeding a predetermined value above normal free passage requirements, such as might be encountered from inertia lock up of the retractor incident to deceleration requiring occupant restraint, is employed to actuate the snubber in a manner which fully locks the webbing for zero slip through the static loop and leaves the webbing limp on the retractor side. Locking is accomplished without wedging or otherwise subjecting the webbing to weakening compressive forces which would cause tearing or reduced capacity and yet provides complete locking up to the full tensile capacity of the webbing with zero slip.

In a preferred embodiment high crash level loading of the belt is adapted to permanently deform an element in the snubber action to verify in post-accident inspection that the belt was in use and the restraining system functioned properly. In an optional preferred embodiment resilient means responsive to intermediate loads exceeding requirements for free webbing passage through the loop at less than values incurred under accident deceleration permit snubber activation and restoration to normal free passage condition without damage or requirement for repair.

The operation of the static loop snubber, once activated, in absorbing the full belt load involved in occupant restraint relieves the retractor of high load capacity requirements making it possible to employ an extremely light duty construction suitable for example to handle only maximum belt pull in the order of 10 pounds as compared with conventional 2000 pound load capacities required by the restraint system under crash deceleration conditions. Thus, lightweight, plastic, cost saving construction may be employed extensively for many of the operational parts formerly requiring heavy duty steel construction. In addition lock up at the static loop converts the normal "pulley" function where a double belt pull load is applied to an "anchor" function with only single belt pull load applied to the mounting thereby greatly reducing the structural capacity requirements of the pillar. Finally the marked reduction in excursion incident to 100% non-slip locking at the static loop renders a single shoulder belt system so much more effective that the necessity for a supplemental lap belt is minimized and may ultimately be dispensed with greatly simplifying and reducing the cost of both passive and active restraining systems. Thus, the development of a relatively simple but highly effective static loop providing 100% non-slip snubbing action has produced highly significant sinergistic results.

As a specific example of a total system rendered practical by the static loop snubber of the present invention, a dual spool inertia responsive door mounted retractor providing shoulder with "comfort feature" and lap belt restraint which may be employed as either a passive or active system is disclosed. In order to assure free outspooling and proper belt wind-up during door opening and closing, means to prevent inertia locking and to disengage the comfort feature responsive to door latch opening are provided as well as a convenience hook for manual placement of the lap belt to facilitate exit and entry automatically disengaged by shift lever movement from the park position is provided.

The system includes optional linkage or electromagnet responsive to door opening for disabling the inertia element, as well as the comfort feature when present, to assure absence of the belt locking during door opening and uninterrupted reeling in of the belt webbing during door closing.

BRIEF DESCRIPTION OF THE DRAWINGS

FIGS. 3a-5a are views of a modified construction corresponding respectively to FIGS. 3-5;

As an optional alternative or supplement, a somewhat flexible strut guide 20b may be provided for raising lap belt 20c above the seat level.

Figure 1:
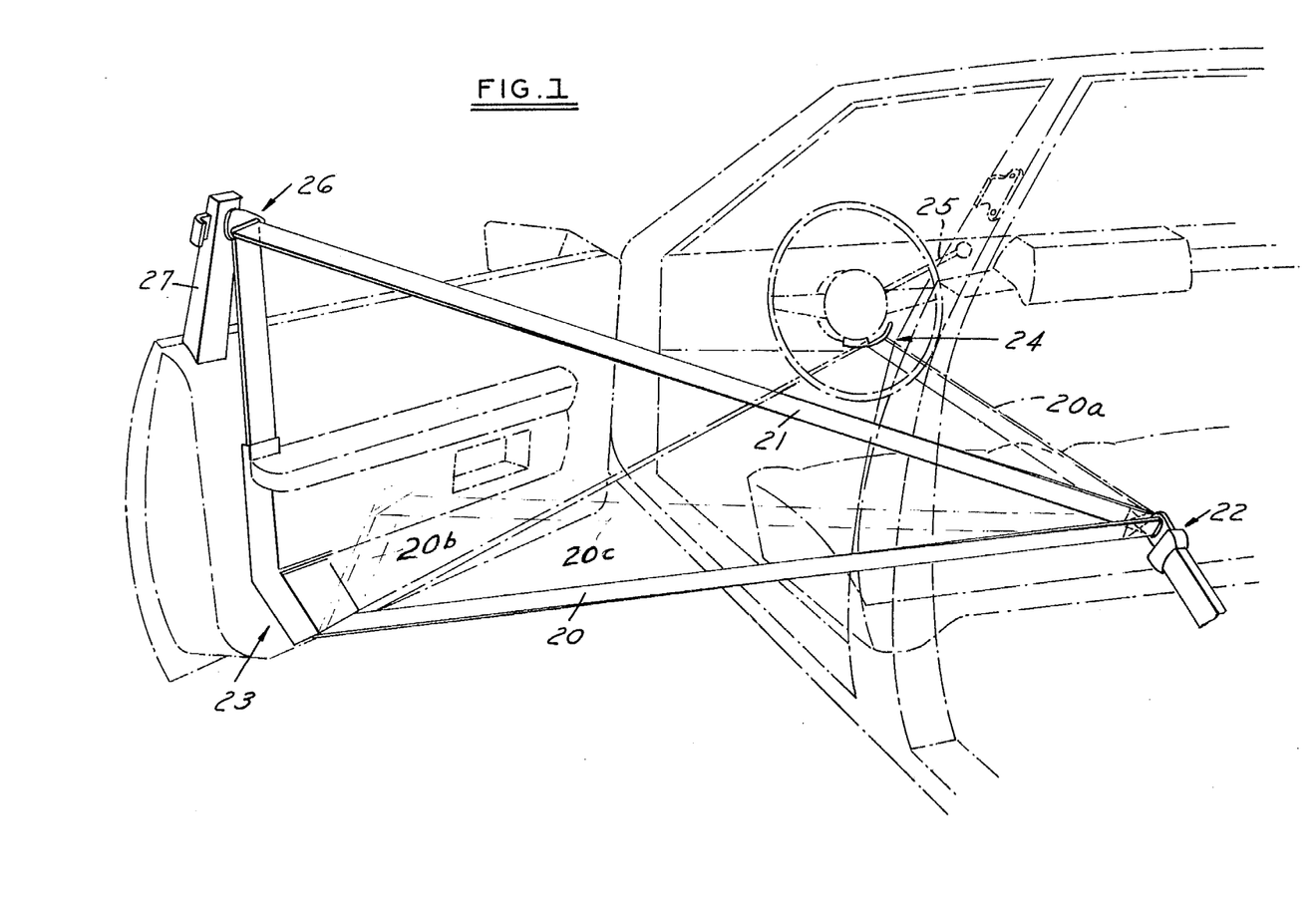
FIG. 1 is a schematic view of the preferred embodiment of the present restraint system applied to the driver's seat with the driver's door in open position.

Referring to FIG. 1 the system in general comprises lap belt 20 and shoulder belt 21 each anchored to fixed center seat escape buckle 22 at one end and each wound on one end of a dual reel inertia locked retractor 23 of the type disclosed in U.S. Pat. No. 4,135,683, but in this case mounted on the door with upper shoulder and lower lap belt webbing guides extending in opposite directions. Lap belt 20, shown in full line in a straight condition leading from anchor 22 to retractor 23, may be retained in position 20a on convenience hook 24 when gearshift lever 25 is in park position to facilitate driver leaving and entering the driver's seat, and is automatically released, as hereinafter described in detail, when the gearshift lever is moved out of park position. The webbing of shoulder belt 21 passes freely through static loop guide 26 anchored to stub pillar 27, or optionally a door window frame when available, from which it extends vertically downward to the other reel of the retractor.

Figure 2:
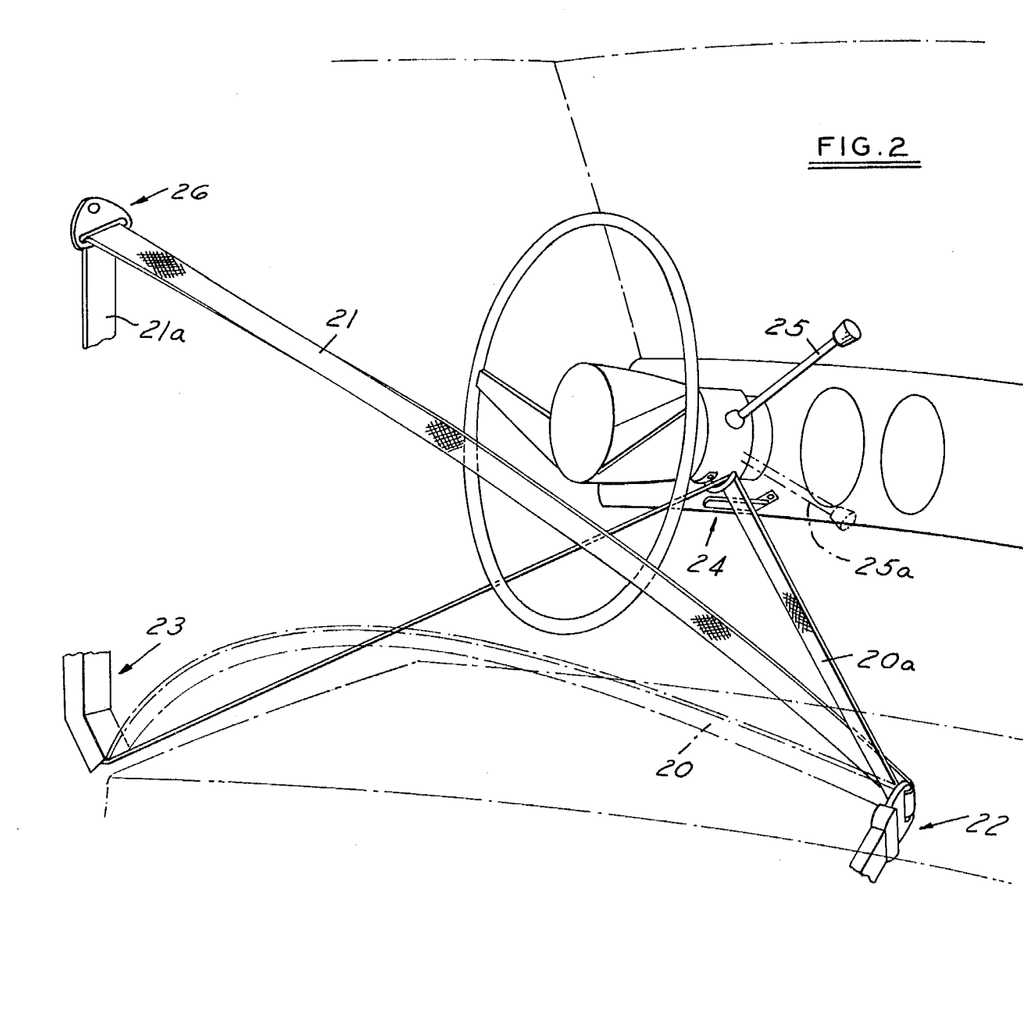
FIG. 2 is a schematic perspective view of the system from a different angle with the door closed.

FIG. 2 schematically illustrates the system with the door closed showing lap belt 20a in full line retained by convenience hook 24 with gearshift lever 25 in park position, the release drive position of gearshift lever 25a being shown in phantom as well as normal lap belt position 20 when released from the convenience hook. While shown in straight condition it will be understood that shoulder belt 21 with the driver in seated position will pass across his upper torso as in the case of a conventional shoulder belt.

Dual reel inertia locked retractor 23 mentioned above is similar to that disclosed in the U.S. Pat. No. 4,135,683, with the addition of a comfort feature as known in the art for relieving shoulder belt tension, and accordingly is not illustrated or described herein in detail, it being understood however that its operation generally retracts the shoulder and lap belt webbing as the door is closed to take up any clearance in passing around the driver and to freely spool out under nominal tension to accommodate manual placement of the lap belt on the convenience hook and to permit door opening for driver exit and entrance.

A special feature of the present invention is provided in static loop 26 in order to meet the problem incident to substantial length of webbing in the shoulder belt necessary to accommodate full door opening with the dual retractor mounted on the door. As may be understood from the illustration of FIG. 1 static loop 26 must normally operate to freely pass the webbing to the retractor as the door is closed, and in the absence of special provision to snub the web at such guide in the event of accident restraint requirements, inherent stretch in the total length of webbing, in the order of eight feet including that extending from the static loop 26 to and around the reel, could result in sufficient stretch to permit the driver to pitch forward into the steering wheel and possibly into head contact with the windshield notwithstanding efficient inertia locking of the reel instantly upon impact.

As will now be explained with reference to FIGS. 3 to 6, static loop 26 of the preferred system embodiment disclosed herein provides intermediate positive snubbing action in response to initial back tension in the inertia locked reel of dual retractor 23 so that only that length of webbing between static loop 26 and anchor 22 is subject to stretch loading under emergency requirements for restraint of the driver. The normally free emergency snubbing action is accomplished by a belt path normally held in open free passing, conditioned by a yieldable and preferably breakable retention means responsive to a predetermined accident initiated inertia locked back tension load from the reeled end of the webbing to provide a positive lock snubbing action. Static loop 26 comprises angle bracket 28 swivally but securely fastened to stub pillar 27 or equivalent door frame by a bolt passing through aperture 29. The angle bracket has a horizontal flange 30 with downwardly projecting end extensions 31 serving to pivotally mount at 32 side arms 33 of a yoke joined by transverse locking bar 34. Transverse web loop rod 35 has end extensions 36 engaging elongated slots 37 provided in side arms 33 which are normally retained in the operative horizontal position shown in FIG. 5 by shoulder engagement of notch 38 with pierced depending projection 39 from bracket flange 30.

Figure 4:
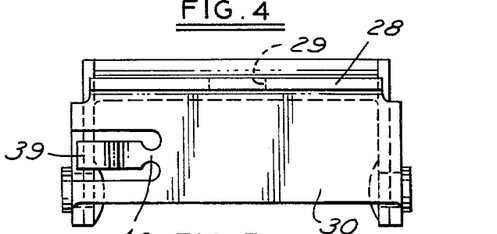
FIG. 4 is a plan view of the fitting shown in FIG. 3.
Figure 5:
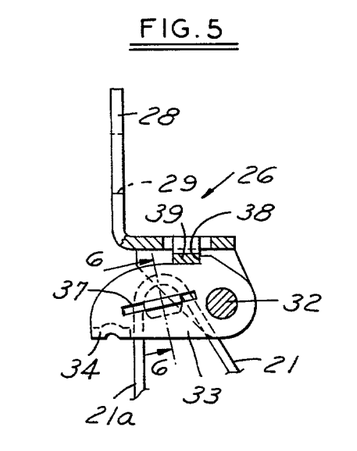
FIG. 5 is a sectional end view taken along the line 5—5 of FIG. 3.

As best shown in FIG. 4 projection 39 is connected to flange 30 by narrow necked portion 40 of predetermined limited strength sufficient to hold locking bar 34 in the inactive position shown in FIG. 5 with rod 35 in free loop position for shoulder belt web 21 during normal door opening and retraction as well as driving. In operation of the shoulder belt when back tension in the vertical belt extension 21a exceeds a predetermined value such as 50 lbs. corresponding to the initial impact loading incident to occupant inertia on the shoulder belt with the inertia reel locked, projection 39 will yield permitting lock bar side arms 33 to pivot downwardly and rod 35 to move into snubbing relation with lock bar 34 thereby preventing any stretch in the depending and reeled portion of the webbing 21a from contributing to occupant impact yield in the shoulder belt system.

The snubbing action on web 21a between locking bar 34 and loop rod 35 combined with frictional wrap of the webbing around the surface of loop rod 35 provide a 100% non-slipping grip on the webbing without compressive destruction or weakening of the web fibers so that total strength of the belt is preserved for occupant restraint. This action is to be distinguished from known snubbers in prior art passive restraint systems which employ spring loaded bars exerting only a limited friction load on the webbing with a maximum ratio between occupant load and back pull in the order of 2:1.

Fracture of the projection at necked portion 40 resulting from an accident will serve as evidence that the belt system was in use, as may be legally required, and that the inertia reel operated properly to lock the belt system.

Figure 3:
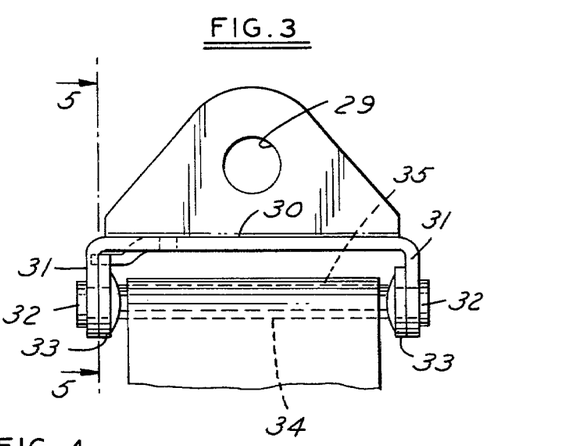
FIG. 3 is a front elevation of a static loop webbing snubber employed in the system.
Figure 3A:
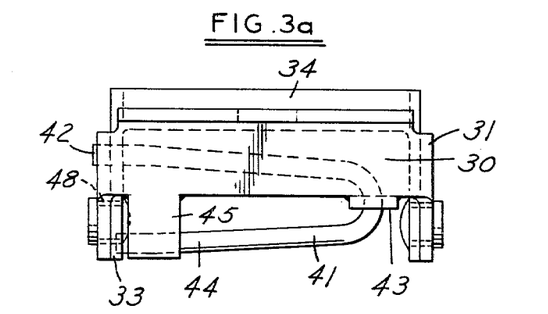
Figure 4A:
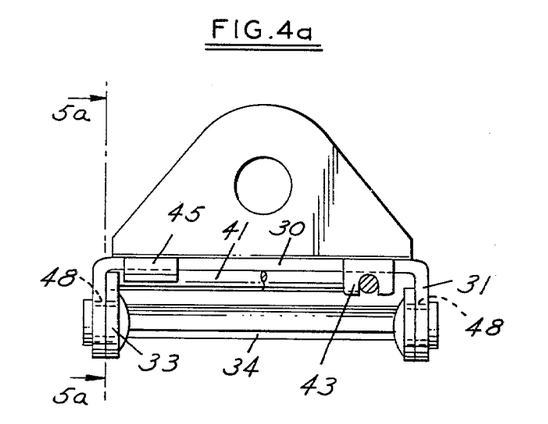

With reference to FIGS. 3a to 5a, as a preferred alternate to fracturing or permanent deformation at a belt loading in the order of fifty pounds which involves a repair replacement of the static loop, it is possible to provide a snubber having non-destructive operativeness combined with a high value crash loading indicator, so that the inoperative position of the snubber will not only be maintained during all normal conditions of door opening and occupant movement during travel, but also restored after snubbing action which may take place under emergency braking action sufficient to activate the inertia lock short of crash deceleration, or from manual belt pull on both sides of the snubber to close the door, or from any like intermediate belt loading, without permanently disabling the static loop snubber. Such restoring action is accomplished by adding a resilient U-spring 41 anchored at 42 in extension 31 and centrally in a depending tab 43 projecting from flange 30 having a spring end 44 located under an arcuate guide 45 projecting from flange 30 engaged by shoulder 46 of one side arm 33 preferably yieldable to the dotted line snubbing position 47 at relatively low belt tensions in the order of ten pounds and only sufficiently higher than encountered in retraction and door opening to assure normal free passage. Upon relief of belt tension, spring return to the full line position will restore normal free retraction operation of the static loop.

Figure 5A:
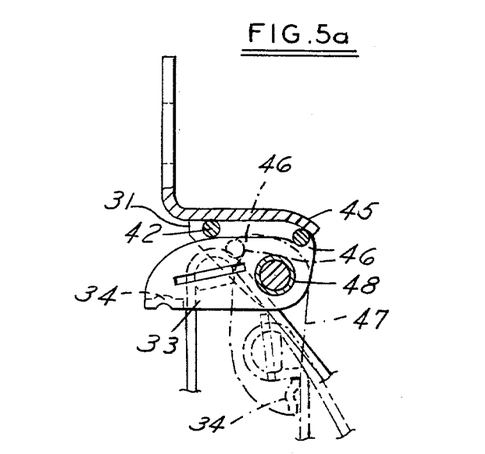
Figure 6:
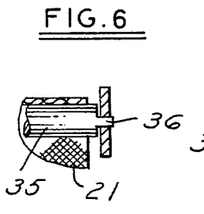
FIG. 6 is a fragmentary sectional view taken along the line 6—6 of FIG. 5.

At crash levels of belt loading bushings 48 of appropriate relatively soft bearing material will yield under overload to provide an indication on inspection that the system was in use and operative.

The relatively low actuating load of the spring return alternative is preferred in order to minimize webbing extension arising through tension wind-up on the spool as well as webbing stretch between the reel and static loop before locking takes place. This also permits minimal construction strength requirements for the dual reel with resultant cost savings and improves the possibility of further cost savings through potential elimination of the need for a lap belt. Thus, the minimization of excursion of the torso through restraint effectively imposed by the shoulder belt correspondingly minimizes the need for supplemental restraint.

A transition from "pulley" to "anchor" function takes place in the static loop with the retraction side going limp through arcuate travel of the locking bar 34 toward the reel during snubbing engagement. Thereafter the entire belt load on the static loop is transmitted through the webbing 21 which would be substantially twice as great in the absence of the snubbing action. This provides a significant reduction in the necessary structural support strength for the static loop since belt loads as high as 2000 pounds would otherwise impose a 4000 pound load on the pillar or door frame or such other mounting for the static loop as might be used in various retraction systems.

While the specific door mounted retractor system disclosed herein illustrates a case where the static loop snubber is most advantageous due to the length of webbing required to accommodate door opening, it will be understood that minimization of occupant excursion under emergency belt load is highly desirable in all safety belt systems where a substantial length of webbing is stored in a retractor or equivalent device. In adapting to other systems which employ different retractor mounting locations such as center console, floor, pillar, roof, or seat, it is only necessary to mount the static loop snubber between the occupant and retractor at a position which provides change in webbing direction in passing through the loop. Lap belts as well as shoulder belts benefit from any reduced extension under load and, even in the disclosed embodiment, may be installed adjacent the retractor exit for eliminating extension of the lap belt from tightening on the reel.

Figure 7:
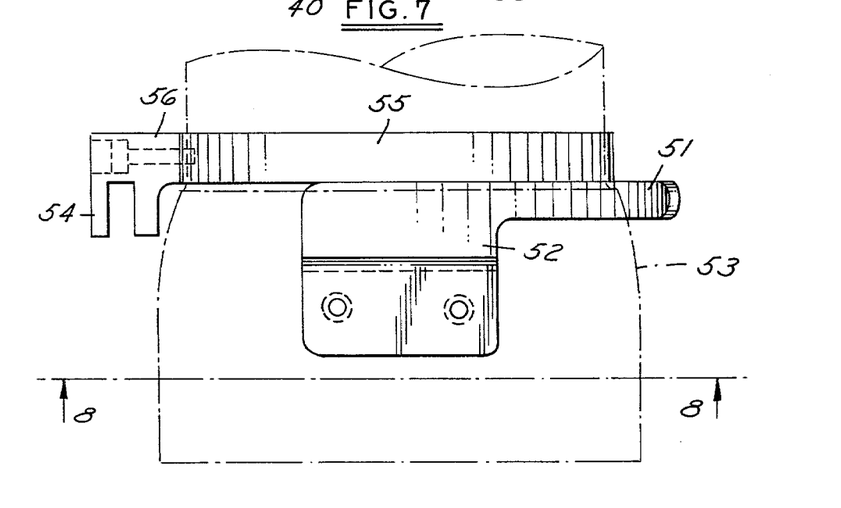
FIG. 7 is a fragmentary view of the steering column having a convenience hook for retaining the lap belt applied thereto.
Figures 8, 9, 15:
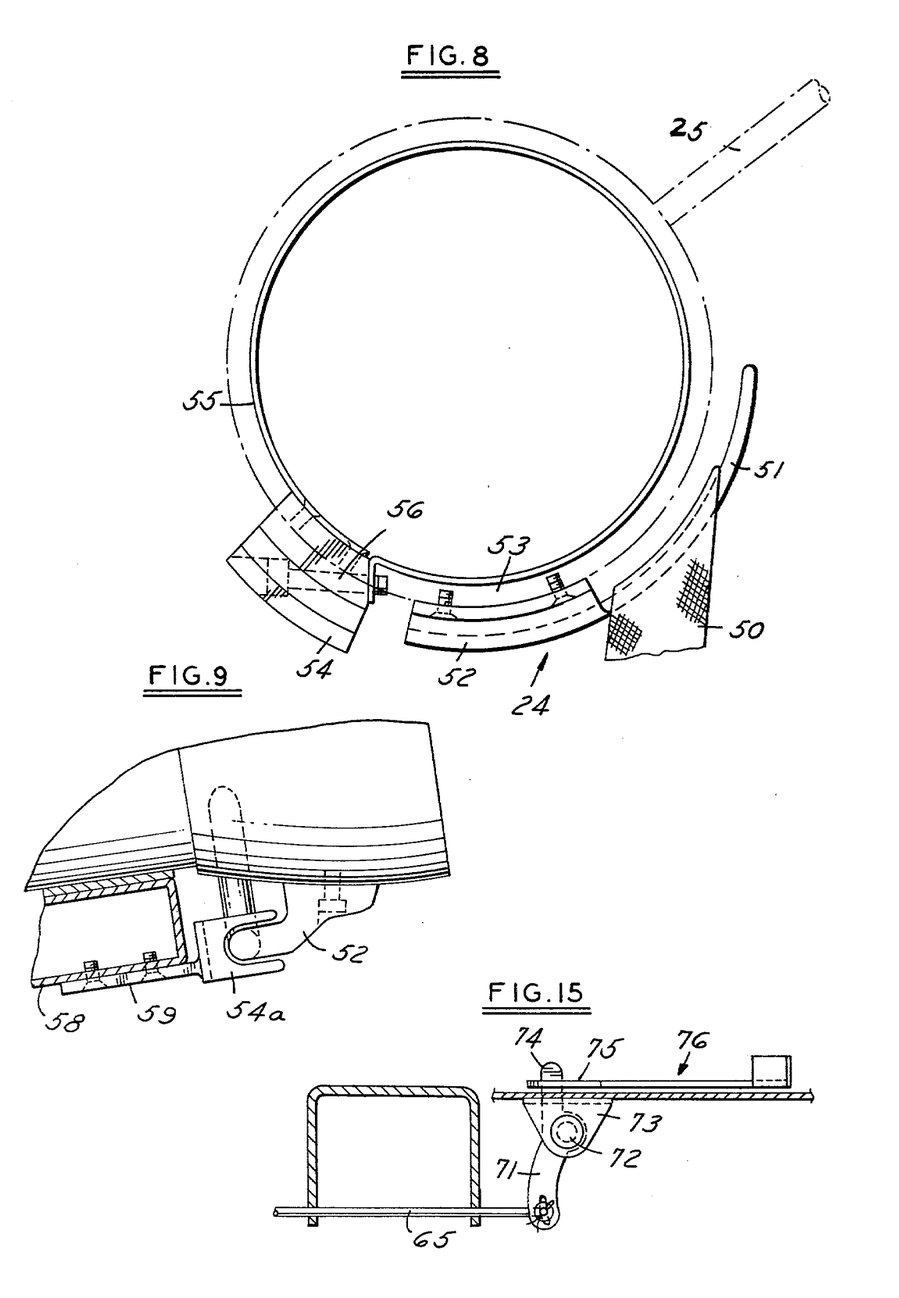
FIG. 8 is a sectional view taken along the line 8—8 of FIG. 7 showing a belt stripping fitting mounted on the steering column.
FIG. 9 is a fragmentary view of an alternate belt stripping mechanism mounted on the dash employed to release the belt from the convenience hook shown in FIG. 8 when the shift lever is moved from park position.
FIG. 15 is a sectional view taken along the line 15—15 of FIG. 10.
Figure 10:
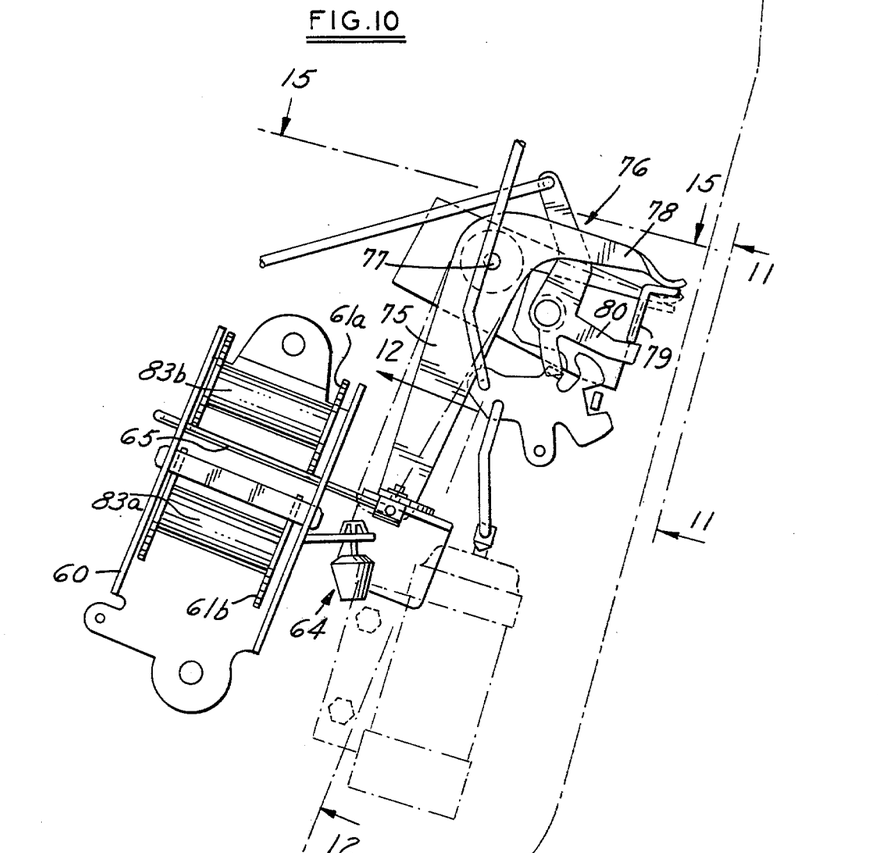
FIG. 10 is a schematic inside side elevation of the driver's door shown in FIG. 1 illustrating the mounting relationship of the dual inertia reel employed in the system to the conventional door latch mechanism.
Figure 11:
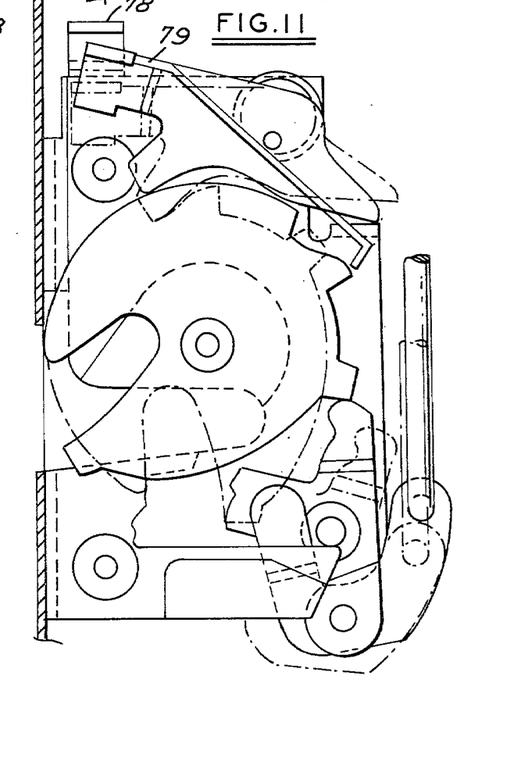
FIG. 11 is an enlarged fragmentary end elevation taken along the line 11—11 of FIG. 10.
Figure 12:
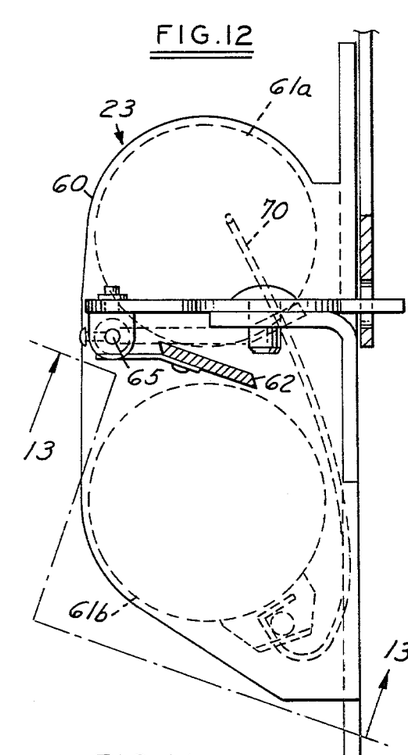
FIG. 12 is an enlarged sectional fragmentary end elevation taken along the line 12—12 of FIG. 10.
Figure 13:
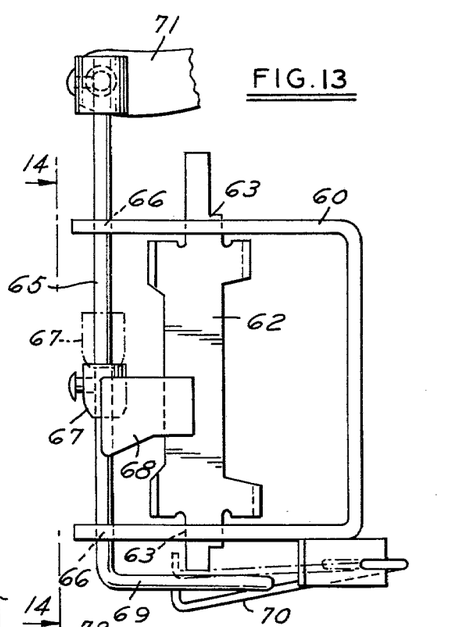
FIG. 13 is a view taken along the line 13—13 of FIG. 12.
Figure 14:
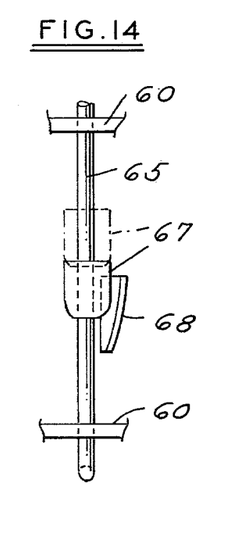
FIG. 14 is a view taken along the line 14—14 of FIG. 13.

With reference to FIGS. 7, 8 and 9, operation of convenience hook 24 is simply to accommodate manual placement of belt web 50 on arcuate hook 51 projecting from arm 52 secured to annular shift column 53 of the vehicle. Stripping head 54 secured by strap 55 to a stationary portion of the steering column adjacent shift lever sleeve 53 is rotated during assembly from the position shown in FIG. 8 to an adjustably effective stripping position next to the belt and locked by screw 56 so that movement of shift lever 25 from the park position shown will automatically strip the belt from hook 51. In the modified view of FIG. 9, stripping head 54a is mounted to dash 58 by flange 59.

With reference to FIGS. 10 to 15, provisions for disabling the inertia element of the retractor from locking the retractor reels as a result of door opening or closing movement and for disabling the comfort feature from interfering with free inward-reeling during door closing will now be described. In each of the views the door lock and an auxiliary linkage associated with the present restraint system are illustrated in dotted line for the closed door condition and in full line for the door open position at which time inertia response is blocked and the comfort feature is disengaged. In the door closed position, retractor 23 having housing 60 mounted on the door, contains first and second tandem spools 83a, 83b, for storing respectively lap and shoulder belts in helical wrap. Each of the spools is secured to a ratchet wheel 61a, 61b engageable by pawl 62 mounted in support openings 63 formed in opposite side walls of the housing. In response to acceleration of the vehicle, pendulum type inertia device 64 causes engagement of the pawl with the ratchet wheels to lock the spools against rotation as described in detail in U.S. Pat. No. 4,135,683.

In response to door opening rod 65 projecting through support openings 66 on opposite side walls of the housing 60 moves rounded nose cam 67 into the full line blocking position for engaging extension 68 secured to pawl 62 for blocking engagement with the respective toothed pawls in response to any inertia forces imposed on the pendulum 64. Extension 69 of rod 65 also disengages comfort feature pawl 70 from its operative position which, when engaged, permits the occupant to loosen the shoulder belt slightly against the wind up tension of the reel after he has occupied the seat, closed the door and the retractor has reeled in the shoulder belt to a snug position. Rod 65 is actuated by lever 71 pivoted at 72 to bracket 73 and through extension 74 in turn actuated by end 75 of bellcrank 76 pivoted at 77 having arm 78 actuated by lever 79 in response to opening of door latch lever 80.

Figure 16:
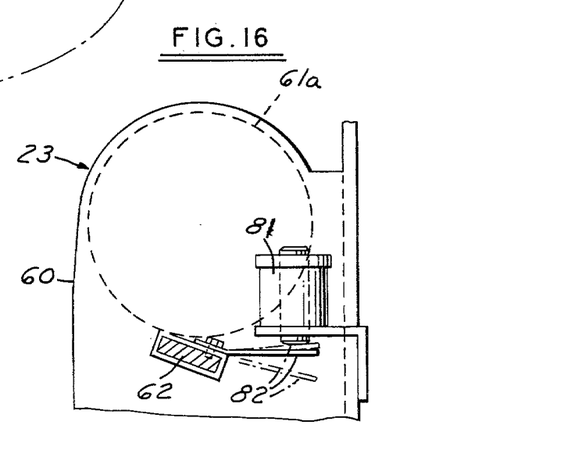
FIG. 16 is a view similar to FIG. 12 showing a modified construction.

Optionally, as shown in FIG. 16 an electromagnet 81 energized in response to door opening attracts and holds lever 82 connected to pawl 62 in a disengaged position.

We claim:

1. Static loop snubber means for use in a vehicle safety belt system having retracting means for storing belt webbing, including attachment means for mounting on said vehicle at a position adjacent an occupant seat involving a change in the direction of belt webbing between the retracting means and occupant restraining portion of the belt, means for maintaining free webbing loop passage throughout normal positioning and retracting tension applied to the belt, means responsive to initial occupant imposed belt loading above a predetermined value for locking belt webbing against loop passage from the retracting side, said means for locking including a snubbing bar and an arcuate smooth surface loop passing bar movable into snubbing relation with said snubbing bar to effect said locking action, and means for establishing a non-destructive minimum clearance between said bars relative to webbing thickness.

* * * * *